Figure 1:
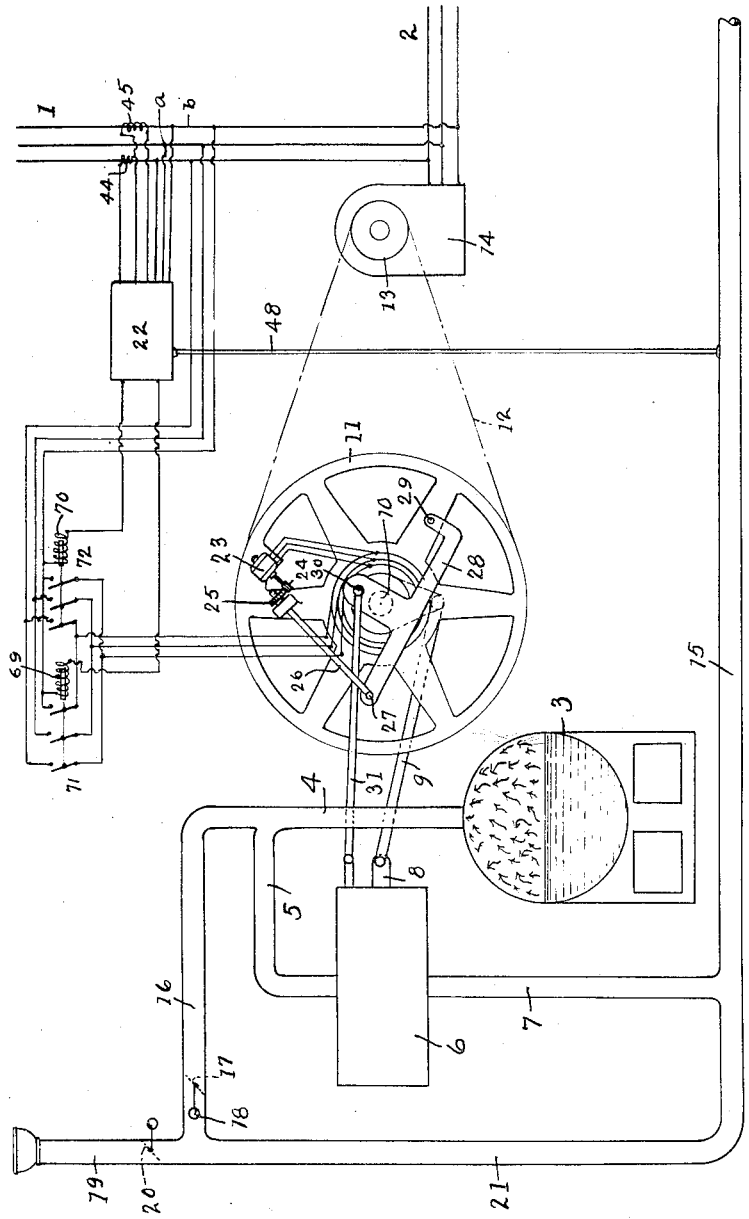

Sept. 8, 1931.   F. O. WALLENE   1,822,071
POWER CONTROL SYSTEM
Filed Feb. 20, 1928   3 Sheets-Sheet 1

Inventor
Frank O. Wallene
By Brockett & Hyde
Attorneys

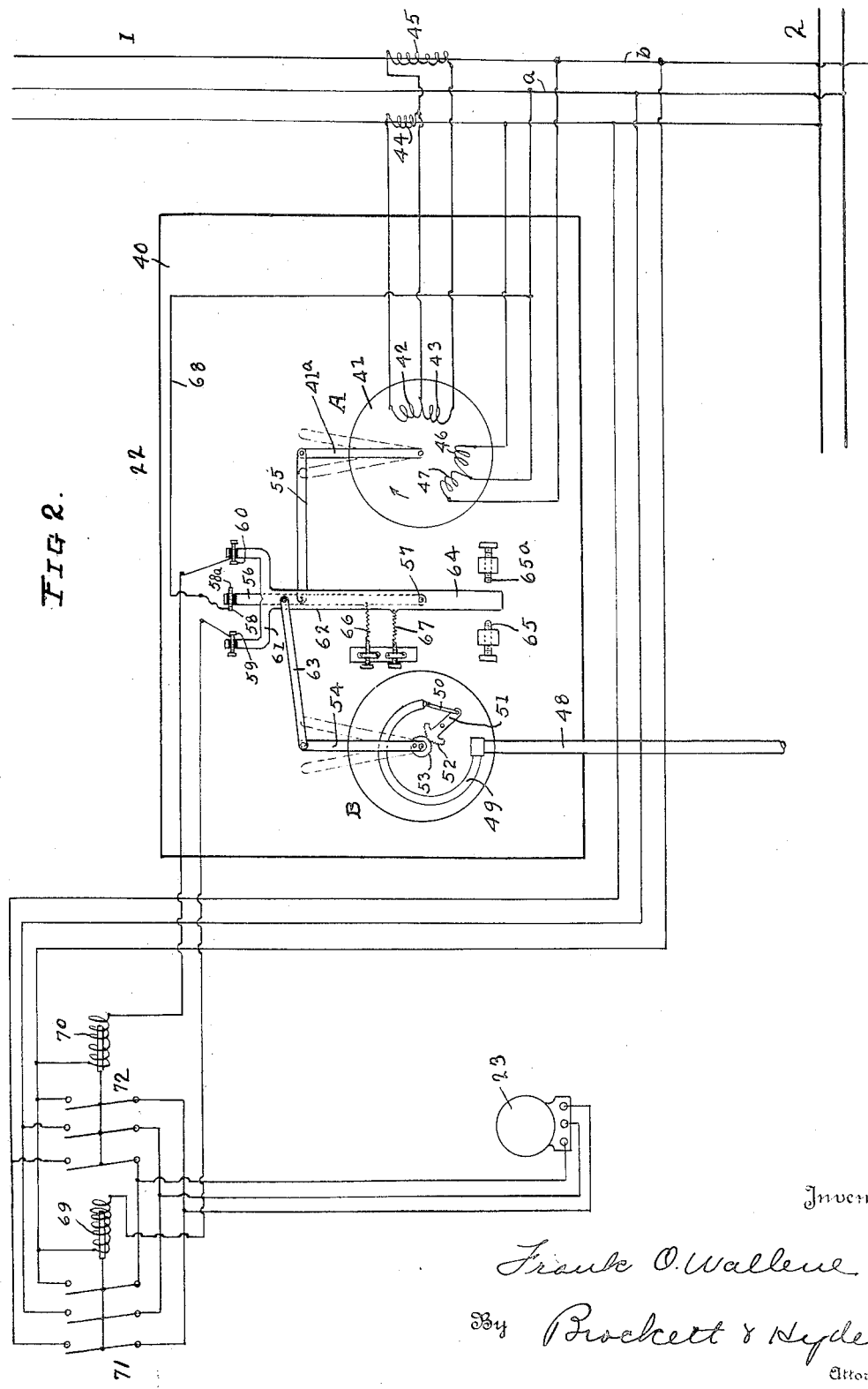

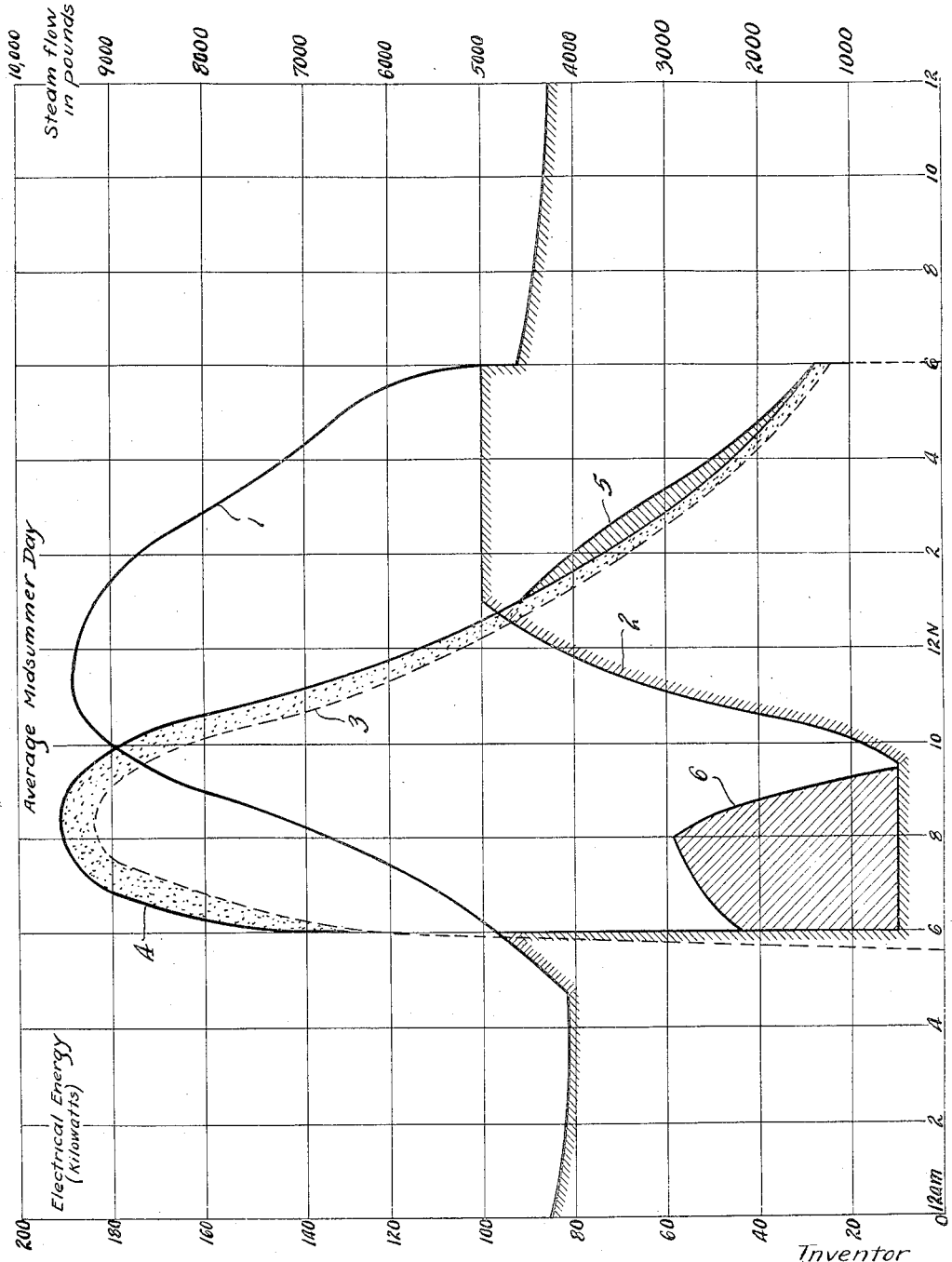

Patented Sept. 8, 1931

1,822,071

UNITED STATES PATENT OFFICE

FRANK O. WALLENE, OF LAKEWOOD, OHIO

POWER CONTROL SYSTEM

Application filed February 20, 1928. Serial No. 255,844.

This invention relates to method and apparatus for controlling power, particularly where power is taken or drawn from two sources and it is desirable for any reason to maintain the value or quantity of energy or power drawn from one source within definite maximum and minimum limits, and when it may also be desirable to more or less supplement the power drawn from said source by power drawn from the second source.

Purely for purposes of illustration and not in any sense of limitation we may assume a plant or factory utilizing two kinds of energy or power, such as electrical power drawn from what may be termed for convenience the primary source, and furnished by its own generators or drawn from the generators of an outside power company, such electrical power being used for operating machinery or carrying any load, either the total electrical load of the whole plant or the load of one department thereof, and also using a second kind of power, say steam power, drawn from another source, conveniently denominated a secondary source, and used for any power purpose in the plant, such as for operating a compressor or heating system, or for supplying heat or moisture for any process or work in the plant. Generally speaking the boiler pressure in a plant supplying its own steam for any power purpose is a hundred to a hundred-fifty or more pounds higher than required for heating or process work alone. It is generally understood and it has been demonstrated to be of economical advantage to abstract the available adiabatic energy from the steam by expanding it through a suitable devise, such as an engine or turbine, to reduce its pressure to the approximate pressure required or desirable in the exhaust steam line.

In a plant operating from two sources of energy, as described, particularly when the electrical energy is purchased from a power company, the cost of the electrical energy is very materially dependent upon the maximum peak load, because the power company not only must furnish the electrical energy used, but must supply and maintain the necessary equipment to take care of the maximum peak load. The cost per kilowatt hour therefore is usually based on the load factor, which is the ratio of the average rate of use of energy through a given period to the maximum peak demand during the same period, and in some localities the occurrence of an abnormal or extra-heavy peak load at any time will have its effect upon and increase the unit cost for current over as long a period as five years, whereas, if a constant load be maintained throughout the billing period the cost per kilowatt hour is much lower, even though the total number of kilowatt hours used may be the same as the plant with the abnormal peak load. It is, therefore, of economical advantage under these conditions, as well as in other conditions, for a user of two kinds of energy, particularly where one source is electrical, to reduce the peak load and keep the total load as uniform as possible.

The present invention, therefore, has for its object to provide a method and apparatus for automatically controlling the amount or quantity of energy drawn or taken from two sources, and in a manner to vary the supply taken from one source, say the secondary source, so as to compensate for what would otherwise be undesirable peak or heavy drafts upon the other or primary source, with the net effect of keeping the draft upon the primary source within predetermined desirable limits, and between these limits controlling the secondary power production by the plant demand for heat energy, and, therefore, reducing the cost for energy from the primary source, and utilizing to make up unusual demands the excess power usually capable of development in the secondary source.

For the purposes stated I utilize a relay control system subject to, affected by, or operating in accordance with, the several demands for energy upon the two sources, primary and secondary, or influenced by the power actually drawn or taken from said sources, and said relay in turn producing its own effect upon one or the other or both of the power sources, so as to vary the supply of power obtained from said sources and used in the plant. In so doing the secondary source of power is properly connected with the primary source and can be made to assist the same by wholly or partially eliminating peak demands upon the primary source, thereby reducing the number of units used and the cost per unit for power actually drawn from the primary source, with a relatively small additional cost for the supplementing power from the secondary source, with an over-all gain in efficiency.

Further objects of the invention are in part obvious and in part will appear more in detail hereinafter.

Figure 3:
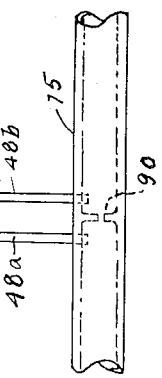

In the drawings, which diagrammatically represent a system employing the invention, Fig. 1 is a diagram of a complete system for supplying to a plant both electrical and steam power; and Fig. 2 is a diagram of a relay and some of the connections shown in Fig. 1; Fig. 3 is a diagram of a modification; and Fig. 4 is a diagram, graphically representing the actual operation of a system in a plant over a given period.

In Fig. 1, 1 represents the electrical leads through which power, in this case electrical, is taken from the primary source, which may be any generator and, particularly, may be assumed to be the generator of a power supply company. Three leads are shown for an A. C. system, although the invention is equally applicable to D. C. systems. At 2 the leads are shown extended for connection to the various machinery and devices constituting the electrical load of the plant. 3 is a boiler of any suitable form, the steam supplied thereby being delivered by way of pipes 4 and 5 to a suitable steam power generator, such as the engine cylinder 6, having an exhaust steam pipe 7. The engine 6 may be any kind of steam engine or turbine and is conventionally illustrated as including a cylinder and piston whose rod 8 and connecting rod 9 turn the shaft 10 and wheel 11 from which a belt 12 is run over a pulley 13 on an electrical generator 14 connected to the plant leads 2 in parallel with the leads 1 from the primary source. The exhaust steam pipe 7 communicates with a pipe 15 through which the exhaust steam is conducted to the plant for its necessary duty therein, such as the uses before ascribed to it, for operating a plant heating system or in some manufacturing process or the like. The boiler steam pipe 4, 5, also communicates with a pipe 16 in which is an automatic pressure valve 17, conventionally shown as a damper controlled by an adjustable weight 18, and beyond which valve the pipe 16 communicates with a stack pipe 19, in which is a similar automatic pressure valve 20. Said pipe 16 also communicates by the pipe 21 with the exhaust pipes 7 and 15. These valves 17 and 20 may be set for any values, but, in the specific instance shown, may be assumed to be set so that valve 17 opens at two pounds pressure and closes at three pounds pressure, while valve 20 opens at ten pounds pressure and closes at nine pounds pressure. This permits of variation in pressure in the pipe 15 between two and ten pounds.

It will be apparent that if the exhaust steam produced by the engine 6, in quantity exceeds the supply necessary for the purposes of the plant, such as for heating or processes, the pressure in the pipes 15, 7, 21 will rise; said pressure will then open the valve 20 and the excess steam will escape to the stack, whereas, if the demand for steam from the plant through pipe 15 exceeds the supply from the engine 6 the pressure in pipes 15 and 21 falls, valve 20 closes, and valve 17 opens by the preponderance of the pressure from the boiler over the effect of its weight 18, whereupon steam flows directly from boiler 3 through pipes 4, 16 and 21 to the pipe 15, to supply the deficiency.

Variations in pressure in the pipe 15 therefore follow fairly closely but inversely the variations in the demand for steam from the plant, and likewise, to some extent, the temperature of the steam in the pipe 15 fluctuates more or less inversely with the demand by the plant for steam.

To interconnect the two sources of energy, viz., the primary source 1 and the secondary source 3, I utilize a relay, marked generally 22 in Fig. 1 and shown in detail in Fig. 2, which is subject to or influenced by the demand for energy on both the primary and secondary sources of power, and more particularly is responsive to variations in both the power drawn from the primary current leads 1 and to the steam drawn from the exhaust pipe 15, or to some quality or condition of the steam, such as its pressure or temperature. This relay serves to control suitable mechanism for obtaining mechanical work from the heat energy of the steam and utilizing the work to perform some of the duty otherwise represented by a peak load on the primary source. For example, the relay may control a steam engine which is directly connected to a piece of machinery or apparatus normally driven by an electric motor supplied from the leads 1, such as a compressor, the arrangement being such that an abnormal demand from the electric motor for energy upon the leads 1 causes the steam engine to perform some or all of the duty of driving the compressor. The means for transmitting to the plant load the mechanical work or power developed, which otherwise would be supplied by the primary leads 1, may be of any suitable kind, such as a direct connection of the engine to a line shaft, or by a belt or gear reduction to a line shaft. As shown, however, the power transmission from the secondary source may include electrical means, such as the generator 14 driven by the engine and operating in parallel with the primary source, the steam engine being controlled by the relay.

The relay 22 controls or operates any suitable actuating device, such as an electric motor 23, the purpose of which is to vary the amount of power or mechanical work supplied to the system from the secondary source, which the motor 23 may accomplish in various ways, such as by reducing the pressure of the steam at the throttle valve of the engine, or by changing the tension of the engine governor spring or the position of the weights on its arm, or even by changing the throw of the eccentric to modify the travel of the link motion for controlling the engine valve to thereby vary the amount of steam admitted to the engine. With the D. C. system referred to the electric motor 23 may control a resistance in the generator field, which varies the electrical output of the generator, producing an automatic response in the governor of the driving steam engine or turbine to automatically vary the steam supply to the engine.

In the drawings, Fig. 1, the actuator motor 23 is mounted upon and rotates with the flywheel or pulley 11. Its shaft is provided with a small pinion 24 which drives a nut 25 threaded upon one end of a rod 26 pivotally connected at 27 to an arm 28 pivoted at 29 upon the pulley, and to an extension of which arm is pivotally connected at 30 the link 31 of the valve mechanism. As the motor 23 rotates in one direction or the other it turns the nut 25 and moves the rod 26 endwise so as to vary the eccentricity of the link pivot 30 and thus vary the amount of valve motion and the amount of steam delivered to and exhausted from the engine.

Referring now to Fig. 2 the relay mechanism includes a suitable support 40 on which are mounted an electrical instrument A subject or responsive to the power taken by the plant from the leads 1, and also an instrument B which is subject or responsive to the steam pressure in the pipe 15 to the plant. The electrical instrument, of course, will be of a character suitable for the kind of current being used. For an A. C. system it will be similar to a polyphase or single phase watt meter. For a D. C. system, it will be similar to a D. C. watt meter. In the arrangement shown, which is A. C., the electrical instrument includes a disk 41 carrying an arm 41a and influenced by coils 42, and 43 supplied by current transformers 44, 45 associated with leads from the main line, and also to potential coils 46, 47 suitably connected to the line. The torque developed by disk 41 is proportional to the amount of the power taken from the primary source 1 by the plant load at 2.

The second instrument B is shown as controlled by or sensitive to the pressure of the steam in the exhaust steam pipe 15, which is connected by a small tube 48 to a Bourdon tube 49 which is provided with a link 50 actuating an arm 51 having a circular rack 52 operating a small pinion 53 connected to an oscillating arm 54. It may be desirable to use two pressure transmitting elements in instrument B, as shown in Fig. 3, placing an orifice plate 90 in the pipe 15 and obtaining movement of the oscillating arm 54 by the differential between the pressures on opposite sides of the orifice and transmitted through the pipes 48a, 48b to differential pressure mechanism effective upon said arm.

Arm 41a of the electrical instrument A is connected by a link 55 to an arm 56 pivoted at 57 and carrying a double ended contact member 58, 58a cooperating with two adjustable contacts 59, 60 on the arms of a yoke 61 carried by an arm 62 also pivoted at 57 and connected by a link 63 to arm 54. The tail 64 of lever 62 swings between two adjustable stops 65, 65a. Arm 56 is influenced by an adjustable tension spring 66 and arm 62 by an adjustable tension spring 67.

The center contact 58, 58a is connected by a wire 68 to the "a" wire of the leads 1, while the contacts 59, 60 are connected through coils 69, 70 to the "b" wire. These two coils 69, 70 separately actuate magnetic switches, marked 71, 72 respectively, which connect the motor 23 to the main leads 1 so as to cause rotation of the motor in one direction or the other according to which switch is closed.

The operation is as follows:

Let us assume that it is desired to keep the power demand on the primary source of power below a maximum of 100 kw. and greater than a minimum of 10 kw. Assuming that the plant is being started and that the steam pressure in the steam process supply line 15 is low or at the minimum of two pounds. The tail of arm 64 therefore rests against stop 65a. Assume now that the electrical part of the plant is being started and the demand for electrical power from leads 1 is 5 kw. or has not reached 10 kw. The adjusting spring 66 being adjusted for a minimum of 10 kw. preponderates over the rotating effort of disk 41, and therefore arm 56 with its contact 58 rests against contact 59, and in so doing energizes coil 69, closing switch 71 and energizing the actuating motor 23 to turn, let us say, in the forward direction, a direction which tends to reduce the energy output of the engine 6 and the supply of exhaust steam to the line 15. The energy output of the engine may be reduced by reducing the pressure of the steam to the throttle valve, or by changing the tension of the governor spring or the position of the weights on the governor arms, but is shown as reduced by changing the throw of the eccentric operating the valve link motion. With the conditions just named, viz., a draft of less than 10 kw. energy from the main leads 1, if no change in energy demand takes place, either from the primary source or from the secondary source, the motor 23 continues to decrease the steam taken by the engine and the output of the secondary source until some change has been brought about or a suitable limit travel switch on the motor 23 stops the motor, which will be readily understood.

Let us now assume that the amount of energy taken from the primary source increases to 11 kw. Immediately the torque of disk 41 exceeds the retarding pull of the spring 66 and permits arm 56 to move over and open the contacts 58, 59, cutting out the motor 23.

Assume now that the power demand rises to 75 kw., and that spring 66 is so set or is of such value that at this time contact is made between 58a and 60. In that event coil 70 is energized to close the circuit of motor 23 in the reverse direction, thereby increasing the amount of steam admitted to the engine or turbine and, in the embodiment shown, immediately supplying energy to the plant load 2 from the generator 14. Assuming that the plant load remains constant during an interval of operation, the supply of energy from the secondary source reduces the torque of the disk 41 and arm 56 falls back, opens the contacts 58a, 60, and stops the motor 23.

So far we have assumed that the exhaust pressure or steam flow through pipe 15 remains constant at a low or minimum value.

Let us now assume that we have a 50 kw. plant load, and that the arms 41a and 56 are in a vertical position. Any increase in demand for exhaust steam from the pipe 15 reduces the pressure in said pipe and, through pipe 48 causes the Bourdon tube to compress and move arms 54 and 62 to the left, Fig. 2, closing contacts 58a and 60, energizing coil 70 and increasing the steam supply to the engine and the quantity of exhaust steam supplied to pipe 15. At the same time more power is developed by the engine 6, less power is taken from the leads 1, and the effect on instrument A is to separate the contacts 58a and 60.

The adjustable stops 65, 65a limit the travel of arm 64, whereas the amount of travel of arm 56 depends entirely upon the position of the contacts 59, 60. This feature causes the heat energy demand control on the secondary source of power to be subservient to or dependent upon the primary source control. The moment contact 58a or 58 engages either of contacts 60 or 59, the actuating motor 23 increases or decreases the amount of steam admitted to the engine, thereby decreasing or increasing the amount of power taken from the primary source, and increasing or decreasing the supply of exhaust steam from the engine. The tendency, therefore, is such that when either set of contacts closes a correcting change in conditions is produced to soon cause the arm 56 to move to a neutral position.

It will be noticed that an increase in power taken from the primary source tends to move arm 56 to the right, while an increase in demand for steam on the process line 15 moves arm 62 to the left, both effects tending to close contacts 58a, 60, the result being to actuate coil 70 and increase the supply of exhaust steam. Taking the plant load as a whole, including both electrical and steam load, an increase in the load throws additional duty on the secondary supply and tends to cause it to make up the deficiency without additional demand being effective upon the primary source of power. Therefore, by properly adjusting the springs 66, 67 and by proper setting of stops 65, 65a and the contacts 59, 60, the power demand on the primary source can be kept below any desired maximum and the total cost for power thereby may be reduced.

In adjusting the mechanism the spring 67 and stop 65 are set so that arm 64 will engage stop 65 when the pressure in line 15 reaches the maximum setting of valve 20, ten pounds steam pressure in the specific instance described. This pressure will, of course, be the maximum pressure necessary to supply the highest peak load for steam or process work in the plant, and any steam generated beyond this value will exhaust to the stack 19. The spring 66 and contact 60 are set to determine the permissible maximum energy demand which may be supplied from the main leads 1, while the stop 65a and contacts 59, 60 are, of course, adjusted according to the desirable minimum current draft from leads 1 and in accordance with the range of movement of arms 56, 61 secured in any particular form of the apparatus.

That the invention may be more completely understood, the diagram, Fig. 3, represents one instance of actual use of the invention during an average midsummer day in a plant, particularly in a dairy plant confronted with the purchase of milk delivered in the morning and requiring pasteurizing or other heat treatment, followed by a cooling operation requiring refrigeration. In this plant, prior to the use of the present invention, the steam for pasteurizing was generated in a boiler and was the only use for steam in the plant in the instance being described. Cooling was produced by a refrigerating plant operated by electrical power purchased from an outside source. In the adaptation of the present invention to this plant, a steam engine was installed in such a manner as to assist an electric motor to drive its load, thus relieving the power company or primary source of that much load. As the requirements for exhaust steam increased further the engine not only carried all the load that the motor had been driving, but also increased the angle of lead of the motor so that it automatically became a generator and supplied current to the plant electrical load, thus reducing further the energy taken from the power company.

In the graph, horizontal distances represent time in hours over a period of one day from midnight to midnight. Vertical distances represent either electric energy in kilowatts or steam flow in pounds. The full line curve 1 represents the electrical power actually used during twenty-four hours to operate the refrigerating plant for cooling the milk. At midnight the load is about 85 kw., rising to 97 kw. at 6 A. M., then to a peak load of 185 kw. at 11 A. M., falling to about 92 kw. at 6 P. M. and keeping fairly constant during the night. This curve represents the total electrical current used both before and after installation and operation of the present system. Prior to the installation of this system the entire electrical demand was purchased from an outside source, and the cost thereof was based on a load factor of 60% with a power rate of approximately one and one-half cents per kw. hour, the total current consumption amounting to three thousand kw. per day, or ninety thousand per month, or $1350.00 per month in all.

Curve 2 represents the current actually drawn from the main leads 1 from the outside source after installation and operation of the present system. The peak load was limited to 100 kw., the total current consumption was 1800 kw. hours and the load factor was 75%, bringing the cost per unit down to one cent per kw. hour, the total outside current cost being $540.00 per month.

Curve 3, in dotted lines, indicates the steam consumption corresponding to curve 1 and prior to installation of the present system. The boiler was started at 5:30, all steam being used for process work and no engine being operated, and the peak demand for steam came at about 8 A. M., with a demand for about 9200 pounds. It then tapered off to 1300 pounds at 6 P. M., when the boiler was shut off. It will be noticed that the demand for steam at 8 A. M. when the milk is pasteurized, precedes by four hours the peak of the current load for producing refrigeration for cooling it.

Curve 4, in full lines, represents the steam consumption after installation of the present system. It follows curve 3 in starting the boiler, but immediately departs therefrom to a higher peak load at 8:15 A. M. of about 9700 pounds and remains above curve 3 until the boiler is shut off at 6 P. M. The dotted area between curves 3 and 4 represents the additional steam consumption by passing a part of the steam through an engine to produce work. The result from 6 A. M. is to very materially reduce the demand for outside electrical current, which drops from 92 kw. to the minimum of 10 kw. at 6 A. M., continues at the minimum of 10 kw. until 9:30 and then gradually rises to the maximum of 100 kw. at 1 P. M. By this time the peak steam load has passed and the electrical refrigerating load is a maximum and, indeed, is beginning to fall.

It is generally agreed that when the exhaust pressures average somewhere from two or three to ten pounds above atmosphere, as much as 90% of the heat admitted and even more is exhausted from the cylinder into the exhaust line. The loss of heat in the steam due to the work done by the engine, is indicated by the dotted area between curves 3 and 4.

At 9:30 A. M. the steam requirement tapers off and the electrical requirement continues to rise. The exhaust pressure therefore builds up, and arm 62, Fig. 2, moves to the right, making contact between 58 and 59, thus decreasing the amount of work done by the engine and allowing the primary electrical source to carry a greater portion of the electrical load. As the demand for process steam continues to decrease the engine allows a greater amount of energy to be taken from the primary source, until at 1 o'clock the maximum demand of 100 kw. is being taken. At this time the engine begins to do more work, increasing the exhaust pressure in excess of the setting of valve 20 in Fig. 1, which is set at ten pounds, and the excess pressure is relieved to the atmosphere, as represented by the supplemental curve 5, the shaded area between curves 4 and 5 representing the steam wasted to the atmosphere.

The shaded area between curves 6 and 2 represents the amount of steam supplied by valve 17 during the interval when the process steam demand exceeds the engine supply.

In the example just given the coal consumption prior to installation of the present system was 120 tons per month. The additional coal burned to produce the additional steam required by the present system was 12 tons per month, increasing the coal cost from $360.00 to $396.00 per month at $3.00 per ton. The current cost was reduced $810.00 per month, and setting off against this the extra coal cost of $36.00 per month, the present system produced a net saving of $774.00 a month for power actually used, the total investment for engine and control, etc., being about $8,000.00.

In the diagram the figures used are based upon experience, which shows that the commercial type engine operating on about one hundred twenty-five pounds boiler pressure with exhaust pressures ranging from three to seven pounds, easily produces 1 kw. hour on fifty pounds of steam, but more efficient engines will probably cut the cost per kw. hour down to thirty to thirty-five pounds of steam, with a greater increase in over-all efficiency.

I have referred herein to the economical advantage of abstracting the available adiabatic energy from steam by expanding it through a suitable device and in the specific instance of plant operation before described, I have referred to a plant in which theoretically all of the steam is capable of use in process or plant work at a pressure of about five pounds. Some discussion of the theoretical and practical economy of the system may be of advantage.

Let us assume that the process steam load requires a pressure of five pounds. The heat content of dry saturated steam at five pounds pressure is approximately 1156 B. t. u. To increase this pressure to one hundred twenty-five pounds in the boiler requires only about 3% more heat, as the heat content has been increased 36 B. t. u. per pound of the steam by weight. If this pressure were expanded adiabatically in a theoretically perfect engine, the heat in each pound of exhausted steam at five pounds pressure could be determined as follows:

A is the heat content of steam at one hundred twenty-five pounds gauge pressure

B is the heat content of steam at five pounds pressure

C is the entropy of five pounds steam

D is the entropy of one hundred twenty-five pounds steam and

E plus F is the total temperature above absolute zero at five pounds gauge pressure.

The heat in each pound of exhausted steam at five pounds pressure, or the heat available for adiabatic work would equal $A-(B-(C-D)(E+F))=154$ B. t. u. The perfect engine would therefore have a steam rate of $$\frac{3415}{154}=22$$

pounds of steam per kw. hour. In practice the majority of engines will attain an efficiency of about 60% of the theoretically perfect engine under these steam pressures, making the steam rate $$\frac{22}{.60}$$

or approximately 36.5 pounds. With the perfect engine the exhaust steam heat content would be $1192-154=1038$ B. t. u. In the commercial engine having 60% heat efficiency the exhaust heat content would be $1192-(154\times.60)=1100$ B. t. u. or 5% less than 1156 which is the heat content of five pounds dry saturated steam. It must be said, therefore, that as we must increase the heat in each pound of steam 3% and suffer a decrease in heat content of each pound of steam in the exhaust, our fuel consumption will rise approximately 8%. For ease of calculation call it 10%. Assuming a coal cost of $3.00 per ton, an evaporation rate of seven pounds of water per pound of coal and steam rate per kw. hour of 36.5 pounds of steam, the fuel cost per one thousand pounds of steam is $$\frac{3.00}{7\times2000}=\$.214$$

and a power production rate of $$\frac{1000}{36.5}$$

or 27.4 kw. hours for $.214. Therefore, at a current cost of one cent per kw. hour from the power company, which is quite a nominal cost of power, the power cost from the secondary source would be 20% cheaper than the electrical or primary source. However, only 10% of the coal cost is chargeable to the secondary power source as long as all exhaust steam is used in process or plant work. This is because only a 10% increase in heat need be added to the steam to make available the adiabatic energy necessary to derive 27.4 kw. h. from each thousand pounds of steam generated. Therefore our equation is $.214\times.10=\$.0214=$ fuel cost per thousand pounds steam $$\frac{\$.0214}{27.4}=\$.00078=\text{fuel cost per kw. h.}$$

In those cases where part of the steam is exhausted to the stack, as in the curve 5, Fig. 4, or even when all of the exhaust steam is exhausted to the stack and only the adiabatic energy is utilized for plant load, the saving in cost of the primary energy, by the avoidance of peak loads, more than offsets the loss through the stack, because the additional heat energy is put into the steam under obviously more efficient conditions of steam generation.

While, in the examples before given, I have referred largely to steam as the medium for converting the heat energy of coal into useful power, it will be understood that the invention is not so limited, nor is it even limited to the use of heat energy as the secondary source of power. For example, the secondary source of power may be an oil, gasoline or any internal combustion engine, instead of a steam or like engine, and the duplex controlling phase can be secured by the use of a double relay with two elements, one sensitive to the power drawn from the electrical or other primary source and the other sensitive to some function or quality of the energy drawn from the secondary source or the demands of the plant therefor, such as by being sensitive to the fluid pressure or temperature in a duct conveying the exhaust gases from the internal combustion engine to some place where they are used for process plant work, with the parts so arranged that the primary source demand controls the pressure or temperature in the duct, depending upon the amount of primary source energy consumed. Again, the secondary source of energy may be water power, compressed air, or in fact, any source of power, the usual arrangement in all of these cases being one where the relay limits the supply of energy from the primary source to avoid undue or undesirable peak loads and utilizing the secondary source to supply an otherwise undesirable demand on the primary source, as before described.

What I claim is:

1. The method of controlling a system embodying a primary source of electrical energy, a secondary source of both electrical and heat energy, both sources being connected to a common electrical load, and control means for said secondary source, consisting in operating said control means to cause said secondary source to supply demands for heat energy and incidentally to produce electrical energy, and to supply demands for electrical energy and incidentally to produce heat energy, and in so controlling the said operation of said control means that the ultimate draft of electrical energy upon said primary source will be maintained between predetermined maximum and minimum positive finite values, so long as the total draft of electrical energy upon said system as a whole exceeds said minimum positive finite value.

2. The method of controlling a system embodying a primary source of electrical energy, a secondary source of both electrical and heat energy, both sources being connected to a common electrical load, and control means for said secondary source, consisting in operating said control means to cause said secondary source to supply demands for heat energy and incidentally to produce electrical energy, and to supply demands for electrical energy and incidentally to produce heat energy, and in so controlling the said operation of said control means that the ultimate draft of electrical energy upon said primary source will be maintained above a minimum positive finite value, so long as the total draft of electrical energy upon said system as a whole exceeds said minimum positive finite value.

3. A system for controlling the supplies of electric and heat energy to a plant where the electric demand always exceeds a minimum positive finite value, including a primary source of electric energy, a secondary source of heat energy which incidentally provides electric energy, and control means therefor sensitive to the relative demands for electric and heat energy, said means being arranged to limit the supply of electric energy from the primary source to not less than said minimum value, and means whereby tendency of the total plant demand for electric energy to fall below said minimum prevents supply of electrical energy from the secondary source.

4. Apparatus of the character described, comprising a source of electric energy, a generator of both electric and heat energy, control means therefor, including means sensitive to the heat energy drawn from the generator and to the electric energy drawn from said source and effective upon said generator to vary its electric energy output, and means dependent upon a total electric demand always in excess of a positive finite minimum for confining the total electric draft upon said source between predetermined maximum and minimum limits.

5. A system for controlling the supply of power to a plant, including two sources, one of electric and another of other energy, and control means sensitive to the demand of the plant upon said sources for electric and other energy respectively and arranged to limit both the maximum and the minimum values of the electric energy supply, said means being dependent upon a total positive electric plant demand in excess of said minimum value and being so arranged as to be affected by variations in the demand for said other energy to vary both of the aforesaid maximum and minimum in the supply of electric energy.

6. A system for controlling the supplies of electric and heat energy to a plant where the electric demand always exceeds a minimum positive finite value, including an outside primary source of electrical energy capable at all times of supplying energy in excess of a given maximum value and unavailable for control of its output, an inside secondary source of heat energy which incidentally produces electric energy, and control means responsive to the total plant demand for both heat and electric energy and arranged to confine the supply of electric energy from the outside source between predetermined positive finite minimum and maximum values.

In testimony whereof I hereby affix my signature.

FRANK O. WALLENE.